US008145702B2

(12) United States Patent
Patterson

(10) Patent No.: US 8,145,702 B2
(45) Date of Patent: *Mar. 27, 2012

(54) METHOD AND APPARATUS FOR TEAM BASED STRATEGY PLANNING IN COMPUTER SIMULATIONS

(75) Inventor: Russell D. Patterson, Carlsbad, CA (US)

(73) Assignee: Sony Computer Entertainment America LLC, Foster City, CA (US)

(*) Notice: Subject to any disclaimer, the term of this patent is extended or adjusted under 35 U.S.C. 154(b) by 552 days.

This patent is subject to a terminal disclaimer.

(21) Appl. No.: 11/754,113

(22) Filed: May 25, 2007

(65) Prior Publication Data

US 2008/0294782 A1 Nov. 27, 2008

(51) Int. Cl.
*G06F 15/16* (2006.01)

(52) U.S. Cl. ........ 709/203; 709/223; 709/224; 709/250; 703/13

(58) Field of Classification Search .......... 709/202–203, 709/223–224, 217, 250; 703/13, 21–22; 463/41–43
See application file for complete search history.

(56) References Cited

U.S. PATENT DOCUMENTS

| | | | | |
|---|---|---|---|---|
| 5,685,775 A * | 11/1997 | Bakoglu et al. | ................ | 463/41 |
| 5,974,442 A * | 10/1999 | Adams | ........................ | 709/227 |
| 6,564,243 B1 * | 5/2003 | Yedidia et al. | ................ | 704/217 |
| 6,826,523 B1 * | 11/2004 | Guy et al. | ..................... | 709/227 |
| 7,155,477 B2 * | 12/2006 | Blair et al. | ..................... | 709/203 |
| 7,315,801 B1 * | 1/2008 | Dowd et al. | .................. | 709/224 |
| 7,343,625 B1 * | 3/2008 | Zaidi et al. | .................... | 709/203 |
| 7,500,916 B2 * | 3/2009 | Lieberman et al. | ............. | 463/42 |
| 2003/0009565 A1 * | 1/2003 | Arao | ............................ | 709/227 |
| 2003/0195735 A1 * | 10/2003 | Rosedale et al. | ................ | 703/13 |
| 2008/0096663 A1 | 4/2008 | Lieberman et al. | | |
| 2008/0140771 A1 * | 6/2008 | Vass et al. | ..................... | 709/203 |
| 2008/0294417 A1 * | 11/2008 | Brunstetter et al. | ............ | 703/21 |

OTHER PUBLICATIONS

Pending Unpublished U.S. Patent Application by Brunstetter, Aaron et al.; U.S. Appl. No. 11/754,160, filed May 25, 2007, entitled "Method and System for Managing Strategies Created by a Clan Based Strategy Sharing Tool", 39 pages. which includes the application, specification, claims, and drawings.
LPARCHIVE.ORG, "Arcanum Players Guide", http://lparchive.org/LetsPlay/Arcanum/Update%2021/manual.pdf, PDF date created: Jun. 6, 2002; 190 pages.
MOBYGAMES, "Aaron Brunstetter", http://www.mobygames.com/developer/sheet/view/developerId,104961/, PDF date created: Jan. 8, 2010; 2 pages.

(Continued)

*Primary Examiner* — Bharat Barot
(74) *Attorney, Agent, or Firm* — Fitch, Even, Tabin & Flannery LLP

(57) ABSTRACT

A method for use with a computer simulation includes providing an ability to run a simulation in which a plurality of client devices communicate over a network to interact with the simulation, providing an ability to generate a first user interface on each of the plurality of client devices for allowing users associated with the client devices to interact with the simulation, providing an ability to provide information that includes a representation of at least a portion of an environment of the simulation on a subset of the plurality of client devices, and providing an ability to allow users associated with the subset of the plurality of client devices to interact with the information without allowing access thereto by the other client devices. A system for use in running a computer simulation and a storage medium storing a computer program executable by a processor based system are also disclosed.

35 Claims, 15 Drawing Sheets

OTHER PUBLICATIONS

RS Thomas, "Real-time Decision Making for Adversarial Environments Using a Plan-based Heuristic", Published at least by Jun. 30, 2003; Northwestern University, Dissertation, 206 pages.

Sony Computer Entertainment America; "Killzone 2 Guide;" Game User Guide; Believed to be published at least by Feb. 25, 2009; pp. 1-14.

Sony Computer Entertainment America; "Motor Storm;" Game User Guide; Believed to be published at least by Dec. 14, 2006; pp. 1-19.

Sony Computer Entertainment America; "SOCOM 3 U.S. Navy SEALs: Instructional Guidelines;" Believed to be published at least by Oct. 11, 2005; pp. 1-27.

Sony Computer Entertainment America; "SOCOM II: U.S. Navy SEALs: Instruction Manual;" Believed to be published at least by Nov. 4, 2003; pp. 1-27.

Sony Computer Entertainment America; "SOCOM U.S. Navy SEALs Combined Assault: Instructional Guidelines;" Believed to be published at least by Nov. 7, 2006; pp. 1-25.

Sony Computer Entertainment America; "SOCOM U.S. Navy SEALs;" Game User Guide; Believed to be published at least by Aug. 27, 2002; pp. 1-27.

Sony Computer Entertainment America; "Syphonfilter: Dark Mirror: Instruction Guide;" Believed to be published at least by Mar. 14, 2006; pp. 1-27.

Sony Computer Entertainment America; Resistance 2; "Modern Technology;" Game User Guide; Believed to be published at least by Nov. 24, 2008; pp. 1-16.

Sony Computer Entertainment Europe; "Formula One 04;" Game User Guide; Believed to be published at least by Sep. 22, 2004; pp. 1-19.

Sony Computer Entertainment Europe; "Killzone;" Game User Guide; Believed to be published at least by Nov. 2, 2004; pp. 1-19.

Sony Computer Entertainment Europe; "Syphonfilter: The Omega Strain;" User Guide; Believed to be published at least by May 4, 2004; pp. 1-14.

USPTO; U.S. Appl. No. 11/754,160; Office Action Mailed Jan. 13, 2010; 8 pages.

Wikipedia; "Fat Princess;" http://en.wikipedia.org/wiki/Fat_princess; Last Modified on Apr. 4, 2010; Game Released on Jul. 30, 2009; pp. 1-4.

Wikipedia; "Formula One 04;" http://en.wikipedia.org/wiki/Formula_One_04; Last Modified on Mar. 7, 2010; Game Released on Sep. 22, 2004; 1 page.

Wikipedia; "Formula One Championship Edition;" http://en.wikipedia.org/wiki/Formula_One_Championship_Edition; Last Modified on Apr. 9, 2010; Game Released on Dec. 28, 2006; pp. 1-5.

Wikipedia; "Killzone 2;" http://en.wikipedia.org/wiki/Killzone_2; Last Modified on Apr. 15, 2010; Game Released on Feb. 25, 2009; pp. 1-12.

Wikipedia; "Killzone: Liberation;" http://en.wikipedia.org/wiki/Killzone:_Liberation; Last Modified on Apr. 13, 2010; Game Released on Oct. 31, 2006; pp. 1-4.

Wikipedia; "Killzone;" http://en.wikipedia.org/wiki/Killzone; Last Modified on Apr. 14, 2010; Game Released on Nov. 2, 2004; pp. 1-4.

Wikipedia; "LittleBigPlanet;" http://en.wikipedia.org/wiki/Little_big_planet; Last Modified on Apr. 12, 2010; Game Released on Oct. 27, 2008; pp. 1-12.

Wikipedia; "MotorStorm;" http://en.wikipedia.org/wiki/Motorstorm; Last Modified on Apr. 10, 2010; Game Released on Dec. 14, 2006; pp. 1-7.

Wikipedia; "Ratchet: Deadlocked;" http://en.wikipedia.org/wiki/Ratchet:_Deadlocked; Last Modified on Mar. 30, 2010; Game Released on Oct. 25, 2005; pp. 1-6.

Wikipedia; "Resistance 2;" http://en.wikipedia.org/wiki/Resistance_2; Last Modified on Apr. 15, 2010; Game Released on Nov. 24, 2008; pp. 1-10.

Wikipedia; "Resistance: Fall of Man;" http://en.wikipedia.org/wiki/Resistance:_fall_of_man; Last Modified on Apr. 14, 2010; Game Released on Nov. 10, 2006; pp. 1-9.

Wikipedia; "SOCOM 3: U.S. Navy SEALs;" http://en.wikipedia.org/wiki/SOCOM_3:_US_Navy_SEALs; Last Modified on Apr. 11, 2010; Game Released on Oct. 11, 2005; pp. 1-5.

Wikipedia; "SOCOM II: U.S. Navy SEALs;" http://en.wikipedia.org/wiki/SOCOM_II:_U.S._Navy_SEALs; Last Modified on Apr. 14, 2010; Game Released on Nov. 4, 2003; pp. 1-4.

Wikipedia; "SOCOM: U.S. Navy SEALs Combined Assault;" http://en.wikipedia.org/wiki/SOCOM:_U.S._Navy_SEALs_Combined_Assault; Last Modified on Feb. 12, 2010; Game Released on Nov. 7, 2006; pp. 1-3.

Wikipedia; "SOCOM: U.S. Navy SEALs Fireteam Bravo;" http://en.wikipedia.org/wiki/SOCOM:_US_Navy_SEALs_Fireteam_Bravo; Last Modified on Dec. 23, 2009; Game Released on Nov. 8, 2005; pp. 1-2.

Wikipedia; "SOCOM: U.S. Navy SEALs;" http://en.wikipedia.org/wiki/SOCOM:_U.S._Navy_SEALs; Last Modified on Mar. 7, 2010; Game Released on Aug. 27, 2002; pp. 1-2.

Wikipedia; "Syphon Filter: Dark Mirror;" http://en.wikipedia.org/wiki/Syphon_Filter:_Dark_Mirror; Last Modified on Feb. 28, 2010; Game Released on Mar. 14, 2006; pp. 1-5.

Wikipedia; "Syphon Filter: The Omega Strain;" http://en.wikipedia.org/wiki/Syphon_Filter:_The_Omega_Strain; Last Modified on Feb. 17, 2010; Game Released on May 4, 2004; pp. 1-3.

Wikipedia; "The Temple of Elemental Evil (video game);" http://en.wikipedia.org/wiki/The_Temple_of_Elemental_Evil_%28video_game%29; Last Modified on Mar. 7, 2010; Game Released on Sep. 16, 2003; pp. 1-6.

Wikipedia; "Untold Legends: The Warrior's Code;" http://en.wikipedia.org/wiki/Untold_Legends:_The_Warrior%27s_Code; Last Modified on Mar. 6, 2010; Game Released on Mar. 28, 2006; pp. 1-2.

Wikipedia; "Vampire: The Masquerade—Bloodlines;" http://en.wikipedia.org/wiki/Vampire_The_Masquerade; Last Modified on Apr. 15, 2010; Game Released on Nov. 16, 2004; pp. 1-11.

Wikipedia; "Warhawk (2007 video game);" http://en.wikipedia.org/wiki/Warhawk_%282007_video_game%29; Last Modified on Apr. 12, 2010; Game Released on Sep. 20, 2007; pp. 1-8.

USPTO; Final Office Action issued in U.S. Appl. No. 11/754,160; mailed Jun. 29, 2011; 13 pages.

\* cited by examiner

METHOD AND APPARATUS FOR TEAM BASED STRATEGY PLANNING IN COMPUTER SIMULATIONS

CROSS-REFERENCE TO RELATED APPLICATIONS

This application is related to U.S. patent application Ser. No. 11/754,160, filed on May 27, 2007 entitled "METHOD AND APPARATUS FOR GENERATING AN EVENT IN RESPONSE TO INTERACTIONS WITH INFORMATION AVAILABLE ONLY TO A SUBSET OF CLIENT DEVICES IN A COMPUTER SIMULATION", the entire disclosure of which is incorporated herein by reference in its entirety.

BACKGROUND OF THE INVENTION

1. Field of the Invention

The present invention relates generally to computer network communications, and more specifically to online simulations such as online computer games.

2. Discussion of the Related Art

One type of online simulation is an online computer game, which is a type of video game that is played over some form of computer network, most commonly the Internet. Online games can range from simple text based games to games incorporating complex graphics and virtual worlds populated by many players simultaneously.

It is with respect to these and other background information factors that the present invention has evolved.

SUMMARY OF THE INVENTION

One embodiment provides a method for use with a computer simulation, comprising: providing an ability to run a simulation in which a plurality of client devices communicate over a network to interact with the simulation; providing an ability to generate a first user interface on each of the plurality of client devices for allowing users associated with the client devices to interact with the simulation; providing an ability to provide information that includes a representation of at least a portion of an environment of the simulation on a subset of the plurality of client devices; and providing an ability to allow users associated with the subset of the plurality of client devices to interact with the information without allowing access thereto by the other client devices.

Another embodiment provides a system for use in running a computer simulation, comprising: a network; a server coupled to the network; and a plurality of client devices coupled to the network; wherein the server and client devices are configured to run a simulation in which the plurality of client devices communicate over the network to interact with the simulation, generate a first user interface on each of the plurality of client devices for allowing users associated with the client devices to interact with the simulation, provide information that includes a representation of at least a portion of an environment of the simulation on a subset of the plurality of client devices, and allow users associated with the subset of the plurality of client devices to interact with the information without allowing access thereto by the other client devices.

Another embodiment provides a storage medium storing a computer program executable by a processor based system, the computer program causing the processor based system to execute steps comprising: communicating over a network to interact with a simulation in which a plurality of client devices are participating; generating a first user interface for allowing a user to interact with the simulation; providing information that includes a representation of at least a portion of an environment of the simulation; and establishing the user as part of a group of users having access to and which can interact with the provided information; wherein the group of users includes users associated with a subset of the plurality of client devices and that client devices not in the group of users are denied access to the provided information.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Online games and other simulations typically involve a plurality of client devices that communicate over a network to interact with the game or simulation. A user interface is typically generated on each of the plurality of client devices for allowing users associated with the client devices to interact with the simulation.

Many online games and other simulations involve teams or "clans" of users competing against other clans. Such clans may comprise users who are physically located far apart from each other, perhaps in different buildings, states, or even countries. As such, it can be difficult for the users in a clan to communicate with one another to plan a strategy for the game or other simulation.

Some embodiments of the present invention provide a clan based strategy sharing tool. For example, in some embodiments a clan strategy feature allows clan members to create game strategies on an overhead picture of the game map and then share the strategies with the other clan members. Such a feature can be akin to using digital chalk and canvas for sharing information with other clan members before and/or during the game or other simulation. It may provide the clan (or cell, team, guild, etc.) a community feature which allows them to make strategies on a top-down view of the game map that is available only to those with membership in the clan. Thus, such a strategy "chalkboard" may allow the members of predetermined teams to spend time devising and sharing battle plans or other strategy.

Figure 1:
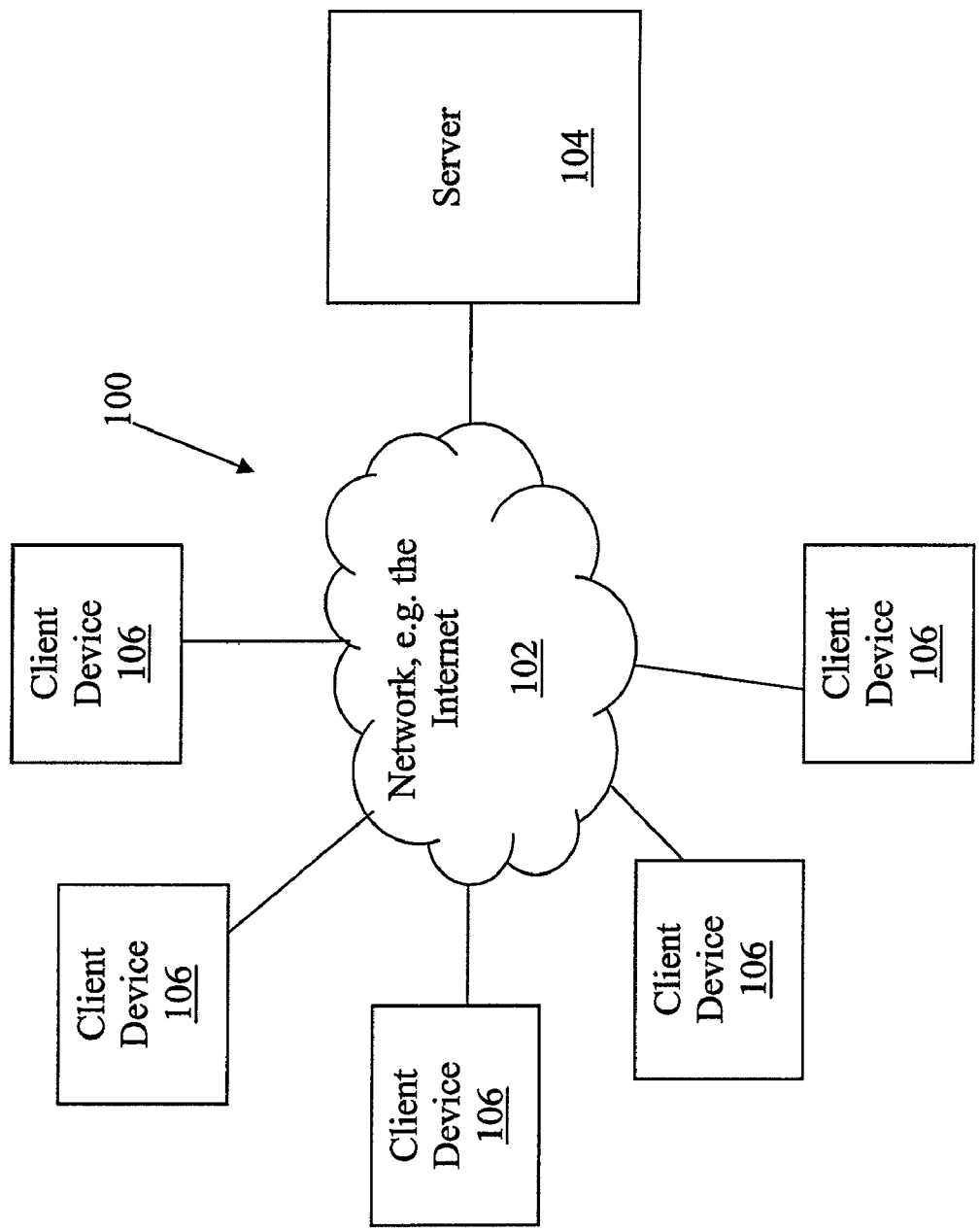
FIG. 1 is a block diagram illustrating a system that may be used for implementing methods and/or techniques shown and described herein in accordance with an embodiment of the present invention.

Referring to FIG. 1, there is illustrated a system 100 that may be used for implementing one or more embodiments of the present invention. The system may include a network 102, such as the Internet, a server 104 coupled to the network 102, and a plurality of client devices 106 each coupled to the network 102. By way of example, in some embodiments the client devices 106 may comprise any type of device, such as a computer, personal computer (PC), notebook or laptop computer, entertainment system, game console, set-top box, television, handheld device, personal digital assistance (PDA), mobile device, telephone, etc.

Figure 2:
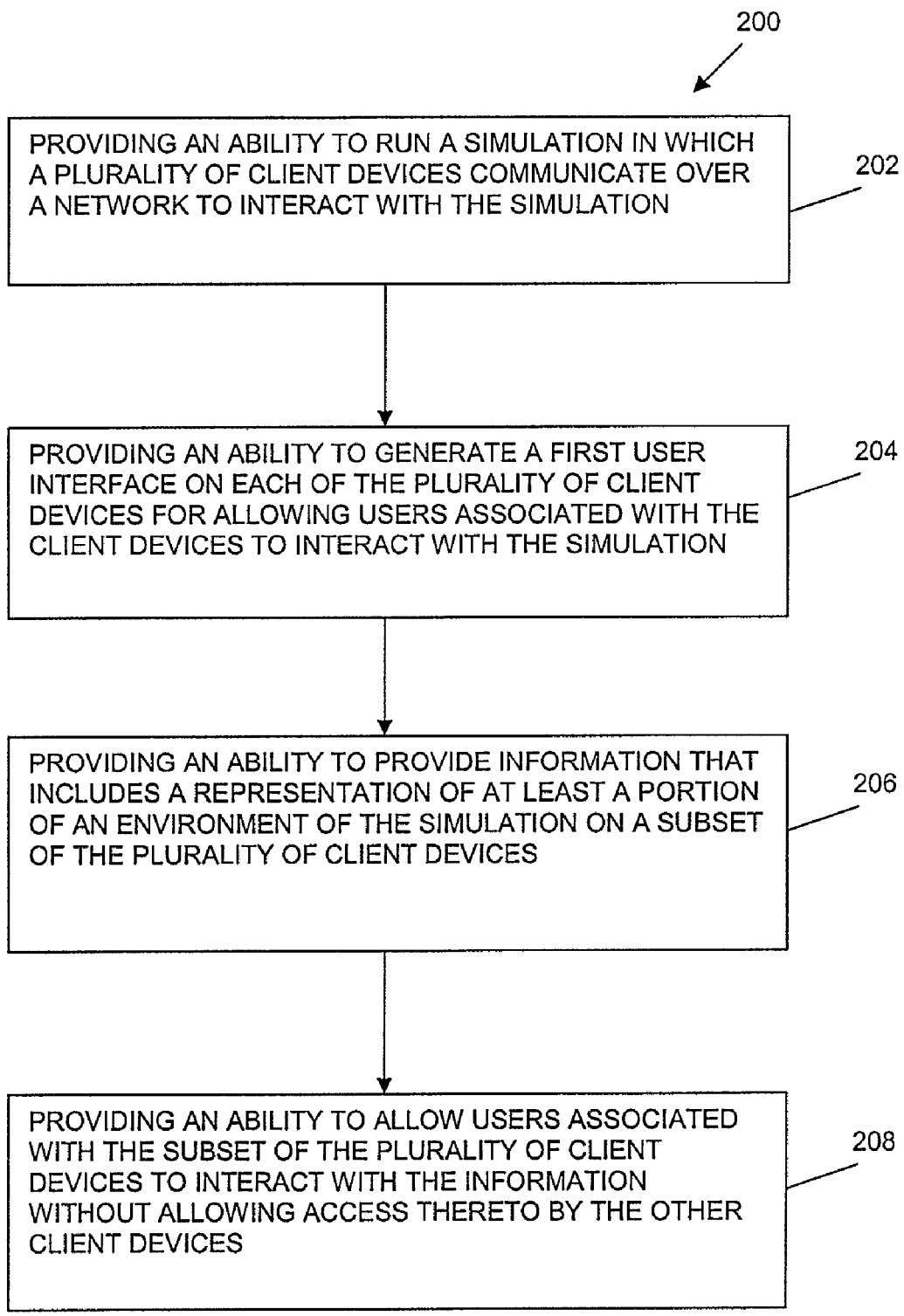
FIG. 2 is a flow diagram illustrating a method for use with a computer simulation in accordance with an embodiment of the present invention.

Referring to FIG. 2, there is illustrated a method 200 that operates in accordance with an embodiment of the present invention. The method 200, which may be used with a computer simulation such as a game, begins in step 202 in which there is provided an ability to run a simulation in which a plurality of client devices communicate over a network to interact with the simulation. In some embodiments, the simulation may be run by executing software components that are installed on each of the client devices and on a server. For example, each of the client devices may have a software component for interacting with the simulation, and a server may have a software component for coordinating the simulation.

Figure 3A:
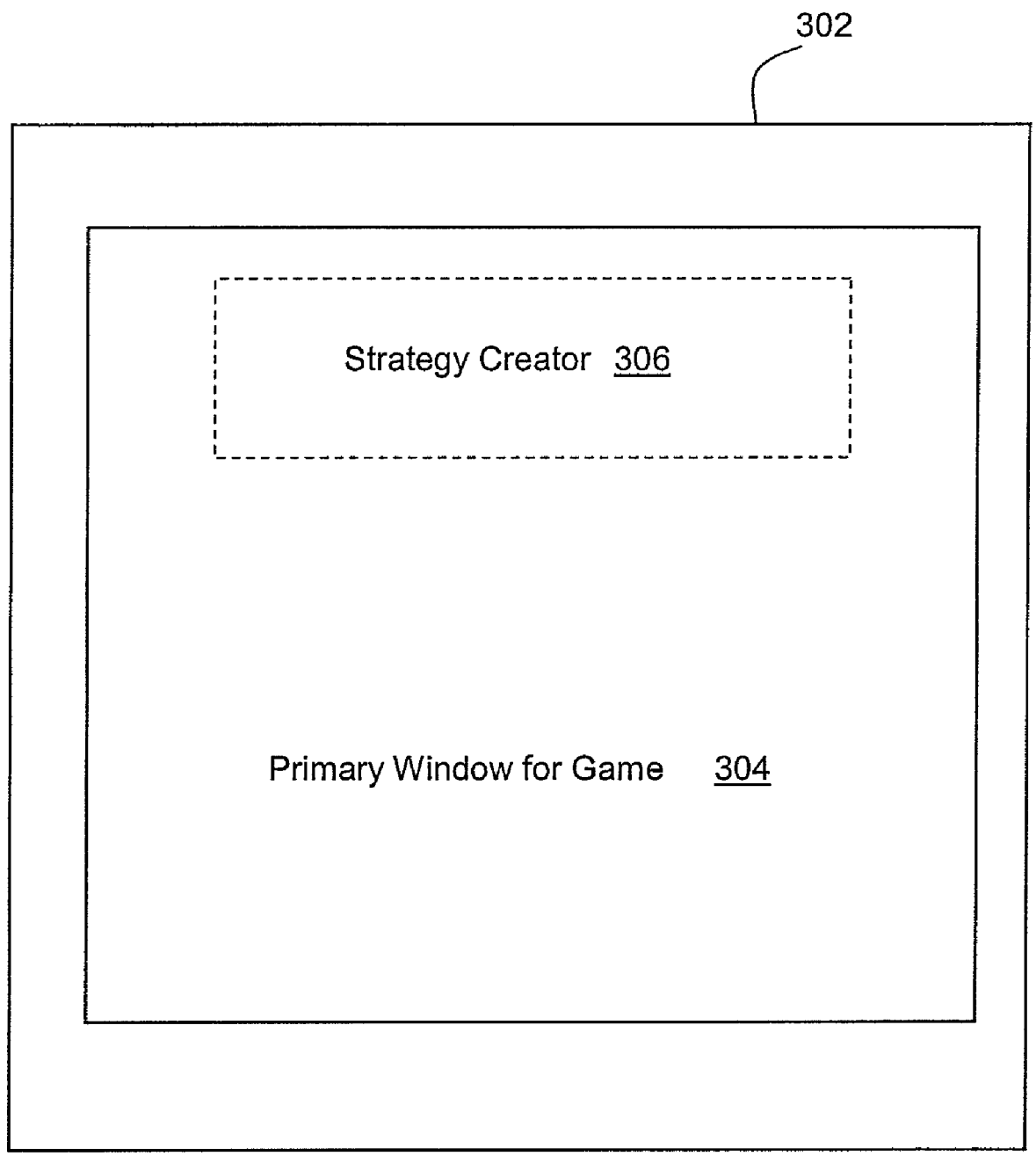
FIGS. 3A and 3B are block diagrams illustrating example interfaces that may be used for implementing methods and/or techniques shown and described herein in accordance with an embodiment of the present invention.

In step 204, there is provided an ability to generate a first user interface on each of the plurality of client devices for allowing users associated with the client devices to interact with the simulation. FIG. 3A illustrates an example implementation of this step in accordance with an embodiment of the present invention. Specifically, a display 302 on any type of client device may display a window 304 that may comprise the first, primary or main user interface for the simulation. A user may interact with the window 304 to interact with the simulation. For example, a user may control one or more characters displayed in the window 304 as part of participating in an online game. Thus, in some embodiments the window 304 may be referred to as a "primary window for the game".

In step 206 (FIG. 2), there is provided an ability to provide information that includes a representation of at least a portion of an environment of the simulation on a subset of the plurality of client devices. FIG. 3A illustrates an example implementation of this step in accordance with an embodiment of the present invention. Specifically, the display 302 on a client device may display an area 306 that may include the information. In some embodiments, this area is where clan members can create game strategies to share with the other clan members. Thus, in some embodiments the area 306 may be referred to as a "strategy creator".

The area 306 may provide information that includes a representation of at least a portion of an environment of the simulation. In some embodiments, the information provided will have some relation to the environment of the simulation. For example, in some embodiments, the representation of at least a portion of an environment of the simulation may comprise a map of a portion of the simulation or game world. For example, the area 306 may comprise an overhead picture of the game map. Such a map may assist clan members in communicating and planning a strategy. This is because the clan members will have an actual map of the game world that they can cause their characters to go down into and move around, fly around, or otherwise interact with in testing and demonstrating various strategies. The users can zoom in and out of the map and view and go into the actual three-dimensional space to get a bird's eye view of various regions of the game world.

In some embodiments, the area 306 is generated on only a subset of the plurality of client devices participating in the simulation. The subset of the plurality of client devices may be the client devices of the users who are in a clan or on a team. In some embodiments, the information provided by the area 306 may be the same for each clan member so that all clan members will see the strategy.

In some embodiments, the strategy creator area 306 may be included in the primary game window 304 as illustrated. For example, the strategy creator may be overlayed directly onto, or integrated into, an existing game interface. As will be discussed below, in some embodiments the strategy creator may be run before game play begins such that the strategy creator may be the only, or the primary item, displayed in the primary game window 304. The strategy creator may be grouped together in one area 306 as shown by the dashed lines, or various elements of the strategy creator may be distributed throughout the primary game window 304. In some embodiments, the strategy creator may be plotted into the three-dimensional game world simulation interface. Thus, in some embodiments the strategy creator may not have its own interface.

Figure 3B:
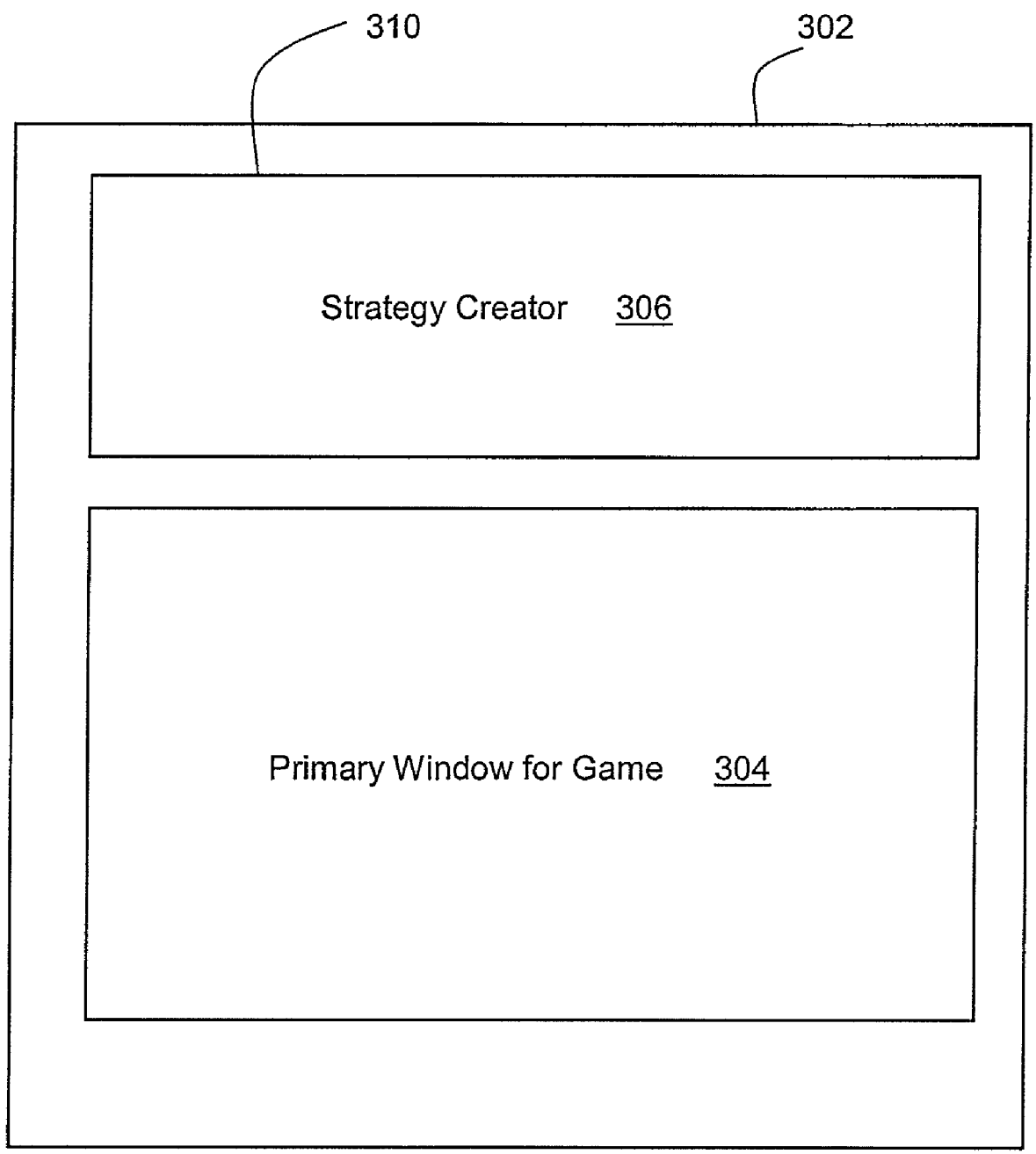

In some embodiments, the strategy creator 306 may be included in a separate user interface or window. FIG. 3B illustrates an example implementation in accordance with an embodiment of the present invention. As illustrated, the strategy creator 306 may be included in a separate or second user interface or window 310. In some embodiments, the strategy creator may have its own user interface or window or a shared interface or window. In some embodiments, the strategy creator may be included in, or integrated with, any other window or interface.

In step 208 (FIG. 2), there is provided an ability to allow users associated with the subset of the plurality of client devices to interact with the information provided by the strategy creator without allowing access thereto by the other client devices. For example, in some embodiments, users are allowed to interact with the information by adding additional information thereto. For example, in some embodiments, users are allowed to add illustrations such as text, arrows, lines, and/or icons that would help communicate a game strategy. In some embodiments, users may add either a voice recording, other audio, or text describing the game strategy for that map/level.

In some embodiments, other client devices that are not included in the subset of the plurality of client devices are denied access to the information provided by the strategy creator. For example, users who are not members of the clan or team may not be granted access to the information. This may allow for the information provided, such as a clan's game strategy, to be kept secret or confidential. As such, other clans or teams will not have access to a clan's game strategy.

It should be well understood that the steps of the method 200 may be executed in any order. For example, steps 206 and 208 may be executed before steps 202 and 204. That is, users may interact with the information provided by the strategy creator prior to the start of the simulation or game. This way, the users of a clan may use the strategy creator to plan a strategy before the simulation starts and before the first user interface is generated. For example, in some embodiments, the strategy creator tool may be run in the "font-end" of the game. The "front-end" of the game is the set of menu screens that are accessed before and after actual game play. This allows the strategy creation and sharing part to happen prior to the clan match or other game being played. For example, strategy creation may occur prior to the shooting of opponents and the controlling of 3D characters in a 3D environment. As such, in some embodiments the method 200 includes an ability to execute the steps 202, 204, 206 and 208, and the steps may be executed in any order.

In some embodiments, any interactions with the information provided by the strategy creator may be stored. For example, any additional information added to the representation of at least a portion of the environment of the simulation may be stored. This way, the strategy may be saved to persistent storage on the server (e.g. a database) and made available to all members of that clan. Other clan members could then make comments in a similar manner and the strategy adjusted.

Figure 4:
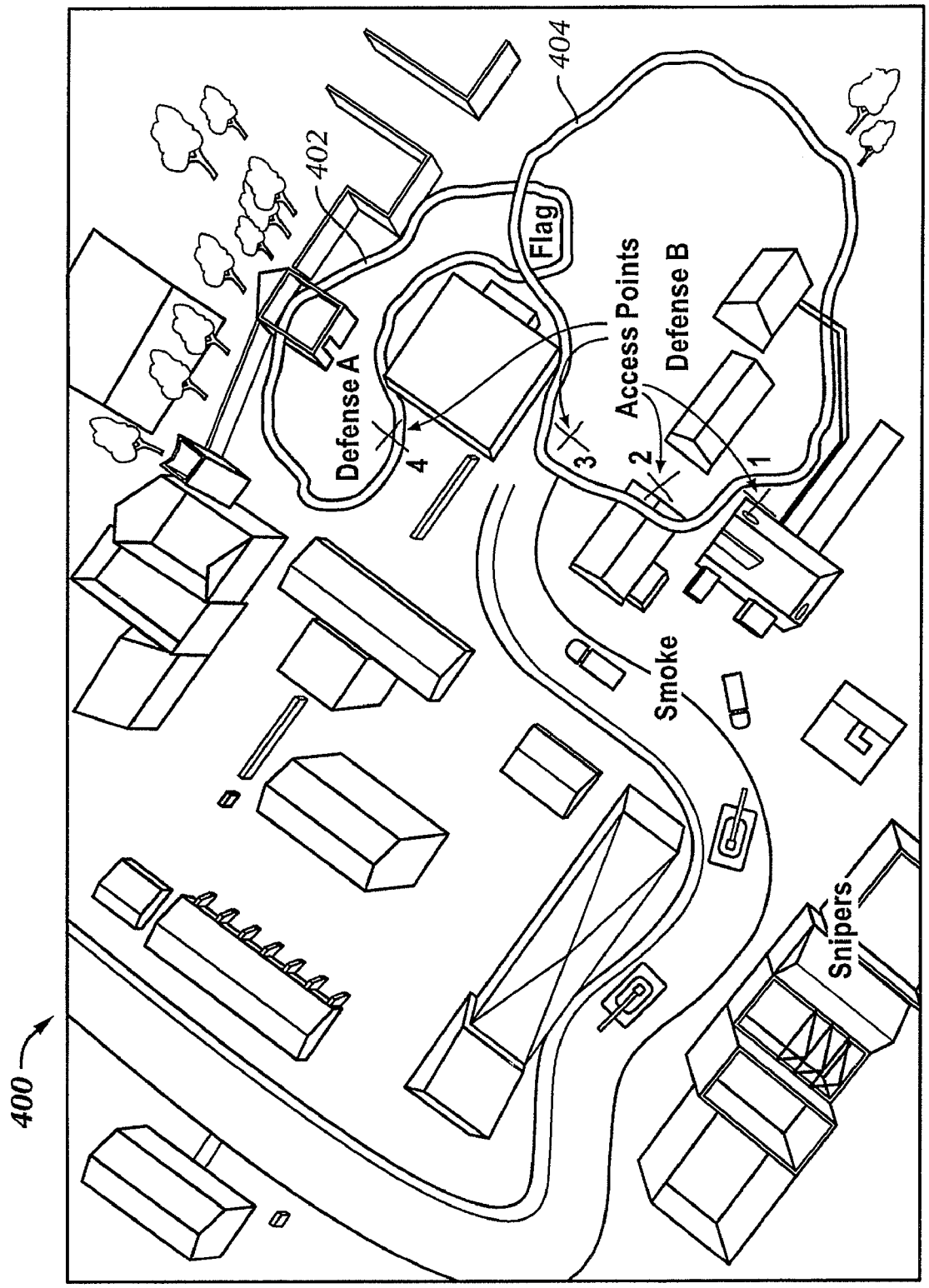
FIGS. 4 and 5 are screen shots illustrating an example application of methods and/or techniques shown and described herein in accordance with an embodiment of the present invention.
Figure 5:
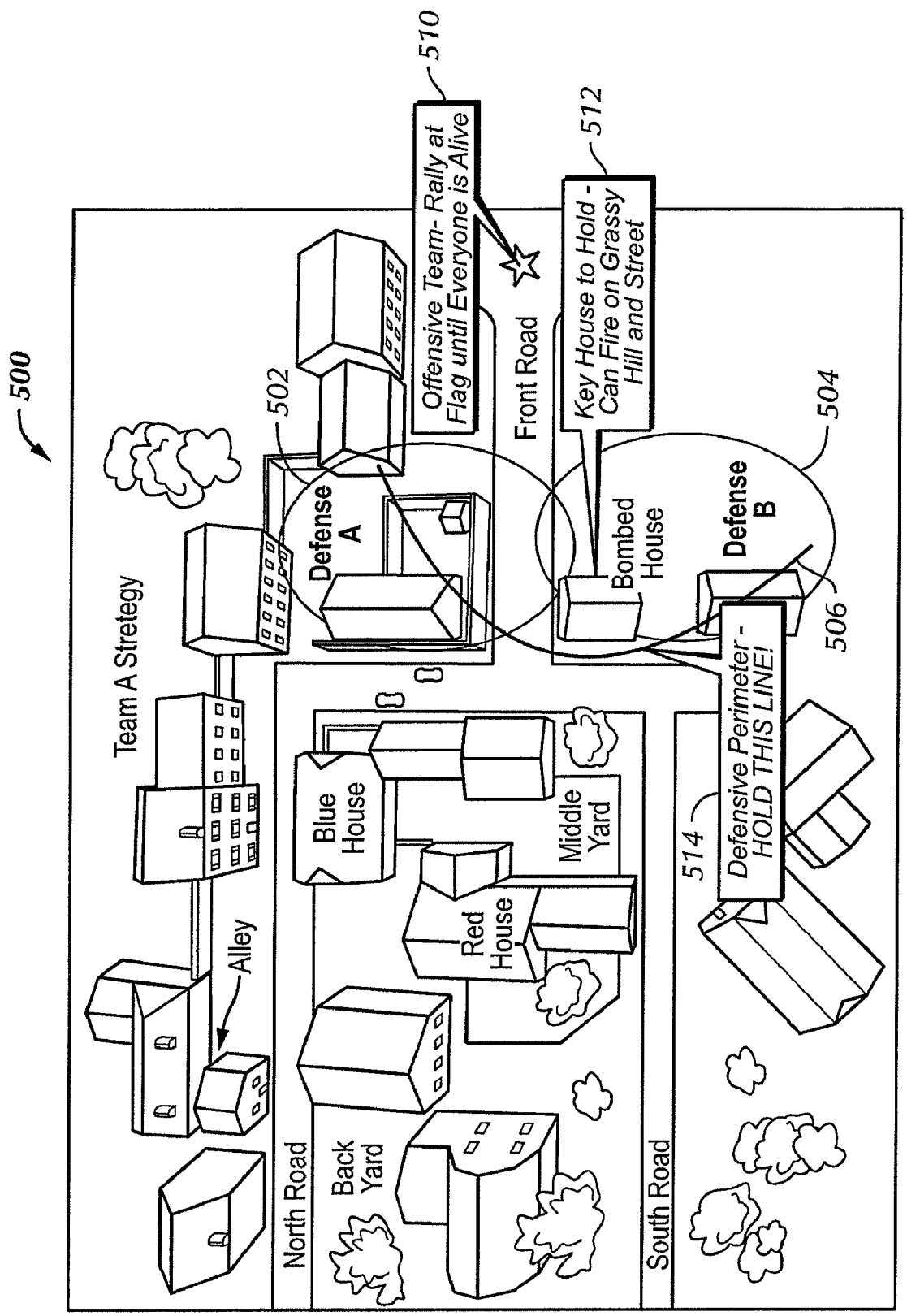

Thus, in some embodiments the method 200 provides a way to facilitate the advanced planning of game play strategies in order to help create a solid gaming community. FIGS. 4 and 5 illustrate examples of how such strategies may be planned in accordance with embodiments of the present invention. Namely, the illustrated maps may be displayed in the strategy creator as the representation of at least a portion of an environment of the simulation. The maps may comprise maps of at least a portion of the game world. As shown, the maps include added illustrations such as lines, circles, handwritten notes, text and annotations which may be used to communicate a strategy to the other clan members. The illustrations added to these maps comprise an example of additional information added to the representation of at least a portion of an environment of the simulation.

For example, in FIG. 4 a portion 400 of the actual game map may be displayed in the strategy creator for allowing clan members to create game strategies. In this example the added illustrations include a line 402 identifying "Defense A" and a line 404 identifying "Defense B". Also identified are "Access Points" 1, 2, 3 and 4, as well as a "Flag", "Snipers" and "Smoke". In FIG. 5 a portion 500 of the actual game map may be displayed in the strategy creator. In this example, which is labeled "Team A Strategy", the added illustrations include a line 502 identifying "Defense A", a line 504 identifying "Defense B", and a line 506 identifying a defensive perimeter. The added illustrations may also include text boxes, such as text box 510 which states "Offensive Team—Rally at Flag until Everyone is Alive", text box 512 which states "Key House to Hold—Can Fire on Grassy Hill and Street", and text box 514 which states "Defensive Perimeter—HOLD THIS LINE!". These and/or any other type of added illustrations may be used to communicate a strategy to the other clan members.

In some embodiments, the strategy creator interface may be used to place elements on a timeline which then causes an in-game trigger to notify players of a planned event. For example, the following notification may be placed on a timeline in the strategy: "All out offense blitz at 5:00 minutes into the round." An audio cue or text cue may be set to make this announcement to tell the players of when to alter strategies in unison.

In some embodiments, the method 200 (FIG. 2) may be integrated or built into the game or other simulation and usable with a controller from the client device. In some embodiments, there may be two main components: the client portion; and the server portion.

The client portion may be run on the client devices, such as the client devices 106 (FIG. 1) (e.g. a game console, computer, etc.). This allows for the creation of the strategy via visual and audio elements as well as the viewing of the strategy by others in the clan.

The server portion may run on a server such as the server 104 (FIG. 1) and may handle the storing and retrieval of the data the client uses to visualize the strategy. On the server, the additions made to the overhead maps may be stored separately from the map images themselves. They may be stored as objects to make it easy to later remove an individual element (e.g. an arrow, line, text, etc.). This may also reduce the amount of server side storage necessary to support the feature.

In general, in some embodiments, a user or player uses the strategy creator on a client device to create or draw a strategy or plan. The strategy creator may include a portion of the game map, which may assist in creating the strategy. The server then saves the strategy, which may comprise a simple package of data.

The members of the clan or team may connect to the server and retrieve the strategy creator data at any time. For example, the clan members may review the strategy before the game or other simulation begins. They may make comments, revisions or other input to the strategy, which will also be saved by the server.

Only the clan members will have access to the strategy to view, interact, and/or modify it. This way, the other clan or clans do not receive the strategy and do not have access to it.

When the game or other simulation starts the server may distribute the strategy data to the client devices corresponding to the members of the clan or team. The clan members may then view, interact, and/or modify the strategy data during the game. The client devices may periodically ping the server to receive updates to the strategy or plan or to receive some other information about the plan.

In some embodiments, these features and techniques may be integrated into a game or other simulation so that a strategy for winning can be easily created and shared among clan or team members. Such features and techniques provide an easy to use format that can be accessed by all game players and thus increase the competitiveness and entertainment value of the game play experience.

Some embodiments of the present invention allow user created strategies to be tied into the game or other simulation. For example, in some embodiments, the user created strategy data may be translated into in-game events effecting game play. By taking the users' predefined plan, and turning that into in-game events, notifications, and other graphical or audio cues, the users' ideas may be brought into the game or other simulation, which may change or improve the in-game experience. This provides a flexible strategy management system that may allow users to create objectives that are actually updated with real game data to manage the created strategy. For example, when the primary defenders are killed in a game, an automated strategy manager may determine based upon a user created objective that it needs to notify the backup defenders, and it does so.

Figure 6:
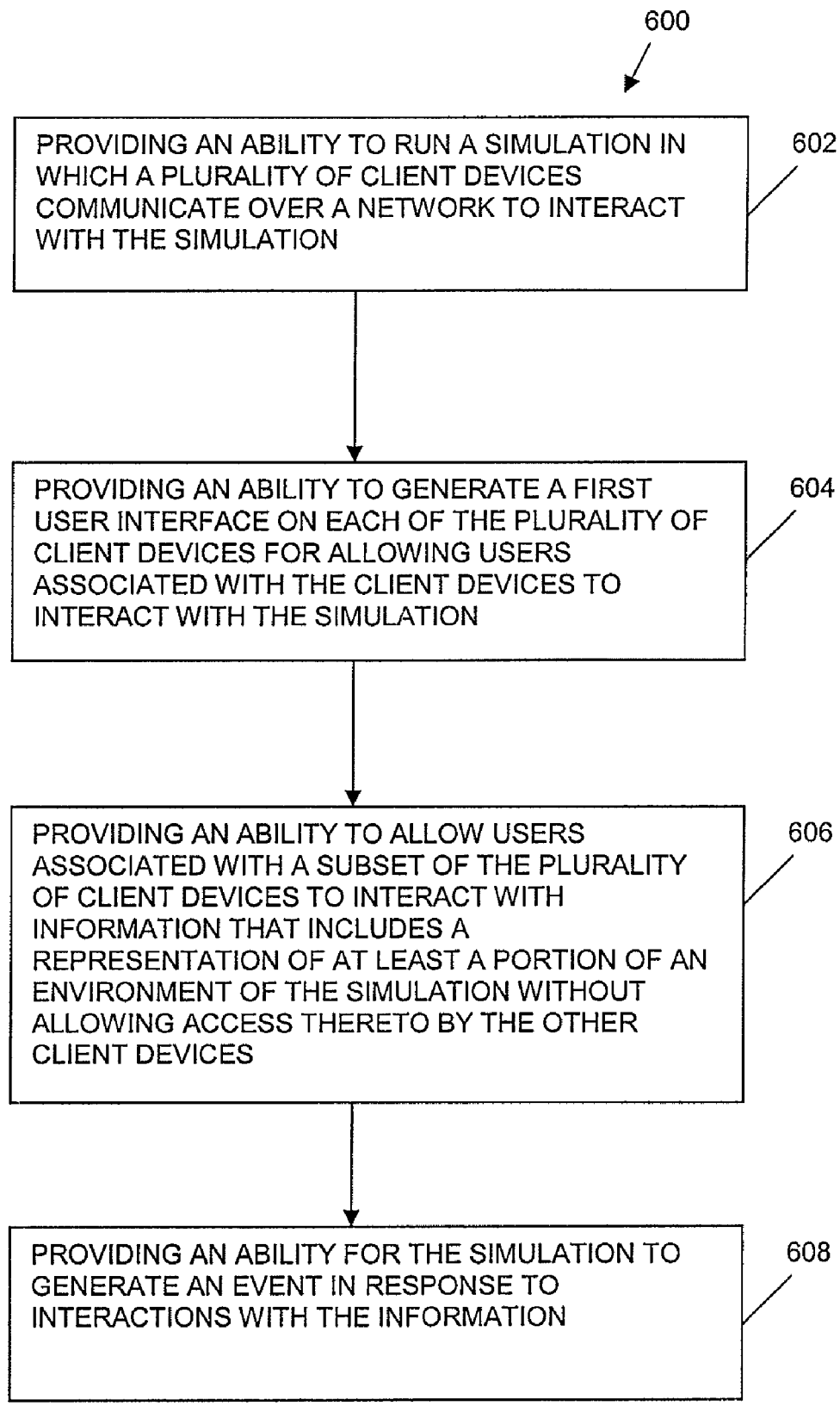
FIG. 6 is a flow diagram illustrating a method for use with a computer simulation in accordance with another embodiment of the present invention.

Referring to FIG. 6, there is illustrated a method 600 that may be used for implementing a strategy manager feature in accordance with an embodiment of the present invention. The method 600, which may be used with a computer simulation such as a game, begins in step 602 in which there is provided an ability to run a simulation in which a plurality of client devices communicate over a network to interact with the simulation. In step 604, there is provided an ability to generate a first user interface on each of the plurality of client devices for allowing users associated with the client devices to interact with the simulation. In some embodiments, steps 602 and 604 may be performed similar to steps 202 and 204 (FIG. 2) described above.

In step 606 (FIG. 6), there is provided an ability to allow the users associated with a subset of the plurality of client devices to interact with information that includes a representation of at least a portion of an environment of the simulation without allowing access thereto by the other client devices. In some embodiments, the information may be provided in a second user interface that is generated on the subset of the plurality of client devices, similar to as is described above with respect to step 206 (FIG. 2). And also similar to step 206, the information may have some relation to the environment of the simulation. For example, in some embodiments, the representation of at least a portion of an environment of the simulation may comprise a map of a portion of the simulation or game world, which may assist clan members in communicating a strategy. In some embodiments, the information is provided to only the subset of the plurality of client devices participating in the simulation, which may be the client devices of the users who are in a clan or on a team. Such users may interact with the information to create strategy data, similar to as is described above.

In step 608 (FIG. 6), the simulation is provided with an ability to generate an event in response to interactions with the information. In some embodiments, the event may comprise a notification, message, audio cue, graphical cue, reminder, etc. For example, the event may comprise a reminder of predetermined strategy. In some embodiments, the event may be provided only to the subset of the plurality of client devices.

In some embodiments, the interactions with the information that triggers the event may comprise adding an element on a timeline, setting an objective to be accomplished, indicating a circumstance that may occur in the game or other simulation, etc. For example, the user created "strategy data" that is created when a user interacts with the information may be stored as raw binary data on a server as described above. This data may then be given to the appropriate users when the game starts. Each user's client device translates the generic game rules set by the users in the strategy data into the game logic for each game. Then, the rules or conditions set by the users would trigger events in the game or other simulation.

The events may help to provide the users with feedback as to what is happening in the game and their progress so that they can move forward based on the principals of the pre-planned strategy. In some embodiments, the events will be generated at a later time after the interactions with the information. For example, the interactions with the information may occur prior to the game or other simulation, and then the events may be generated during the game or other simulation.

Such events may be triggered in many different ways by many different conditions. In some embodiments, the triggering of events may be time based. For example, the strategy data may indicate that after five minutes into the game, an event is to be generated, which may for example comprise a message or a certain condition occurring.

Figure 7A:
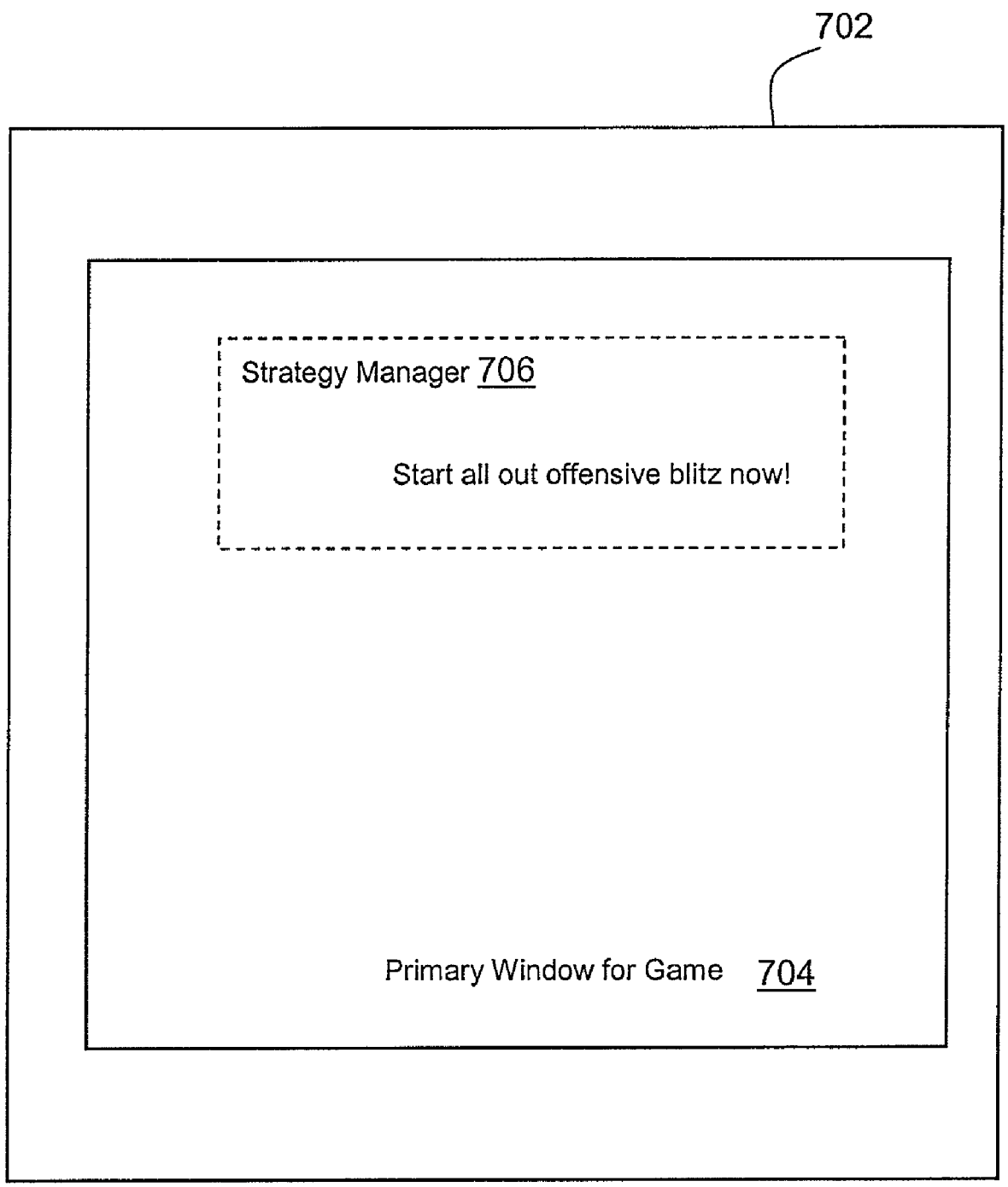
FIGS. 7A, 7B, 7C, 7D and 7E are block diagrams illustrating example notifications and messages that may be used for implementing methods and/or techniques shown and described herein in accordance with embodiments of the present invention.

FIG. 7A illustrates an example of a time based message in accordance with an embodiment of the present invention. Specifically, a display 702 on any type of client device may display a window 704 that may comprise the first, primary or main user interface for the game or other simulation, which may be referred to as the "primary window for the game". An area 706, which may serve as a "strategy creator" where clan members can create game strategies, may also serve as a "strategy manager" during the game. In this example, the strategy manager 706 displays "Start all out offensive blitz now!", which may have been designated in the user created strategy to be displayed at five minutes into the game. Such a message helps to provide feedback to the user or player based on the user-created strategy. In some embodiments, such messages may be generated by the users when the strategies are being formulated.

In the illustrated embodiment, the strategy manager area 706 is included in the game interface window 704. Similar to the strategy creator described above, the information in the strategy manager area 706 may be overlayed onto, or integrated into, the existing game or other simulation interface. For example, because the strategy manager may run concurrently with the game play, the notifications given to the user may be overlayed on top of the main user interface. By way of example, such notifications may comprise text, graphics, audio, icons, etc. The information in the strategy manager may be grouped together in the one area 706 as shown by the dashed lines, or various elements of the strategy manager may be distributed throughout the primary game window 704. In some embodiments, the strategy manager may be plotted into the three-dimensional game world simulation interface. Thus, in some embodiments the strategy manager may not have its own interface.

As will be discussed below, in some embodiments, the strategy manager area 706 may be included in a separate or second user interface or window.

In some embodiments, the triggering of events may be objective based. For example, the strategy data may indicate that after a certain node or other target is taken in the game, an event is generated, which may for example comprise a message providing an updating of the target.

Figure 7B:
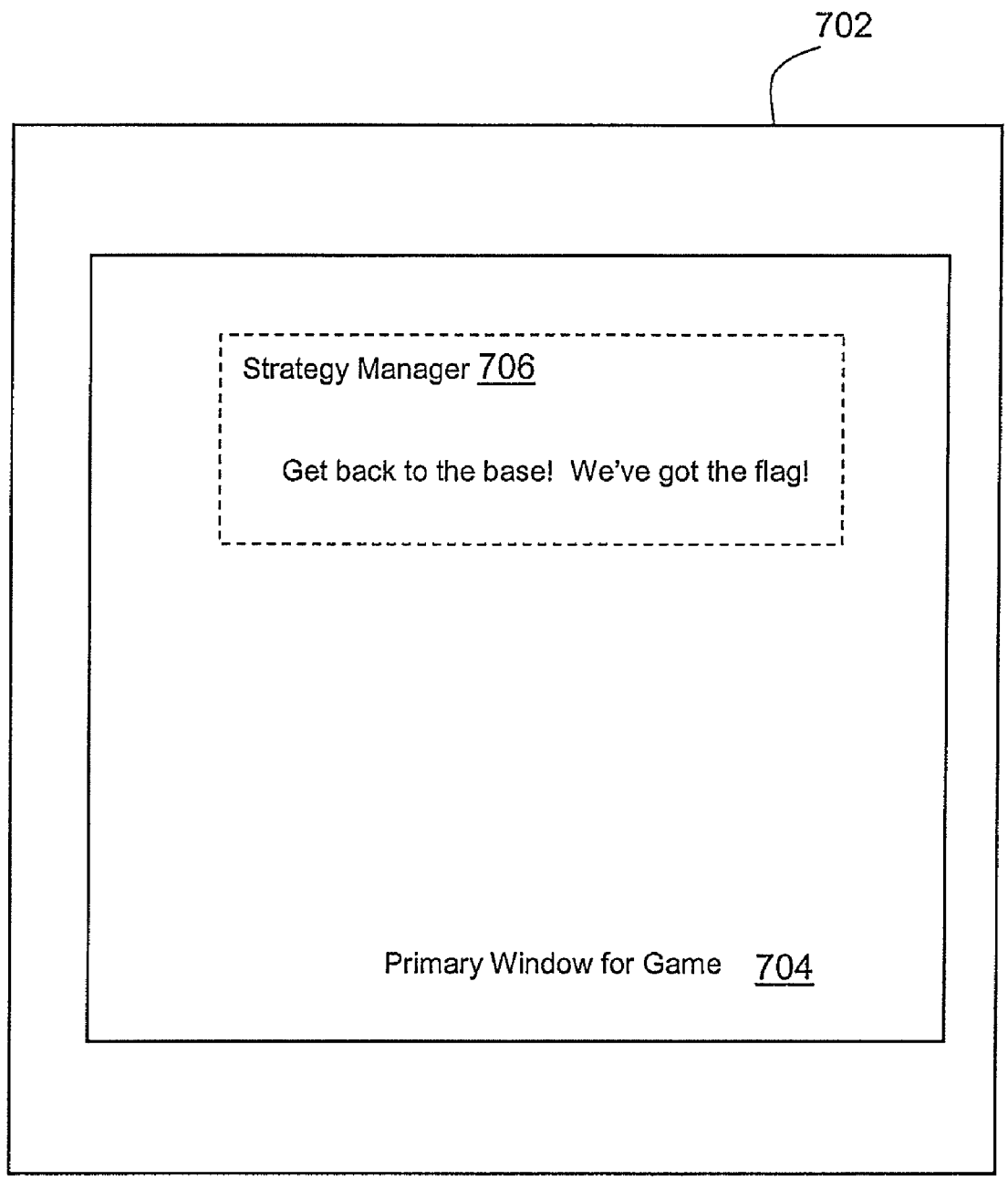

FIG. 7B illustrates an example of an objective based message in accordance with an embodiment of the present invention. In this example, the strategy manager 706 displays "Get back to the base! We've got the flag!", which may have been designated in the user created strategy to be displayed after the flag was captured. Because the strategy manager in the system knows the state of the game, it detected that the flag had been captured, which caused it to display the message as instructed by the user created strategy. This is another example of the strategy manager providing feedback based on comparing the game state to the user created strategy. In this way the strategy manager can push information to the game and the game can push information to the strategy manager.

In some embodiments, the triggering of events may be circumstance based. For example, the strategy data may indicate that when the primary defenders are killed, an event is generated, which may for example comprise instructions for taking one or more actions.

Figure 7C:
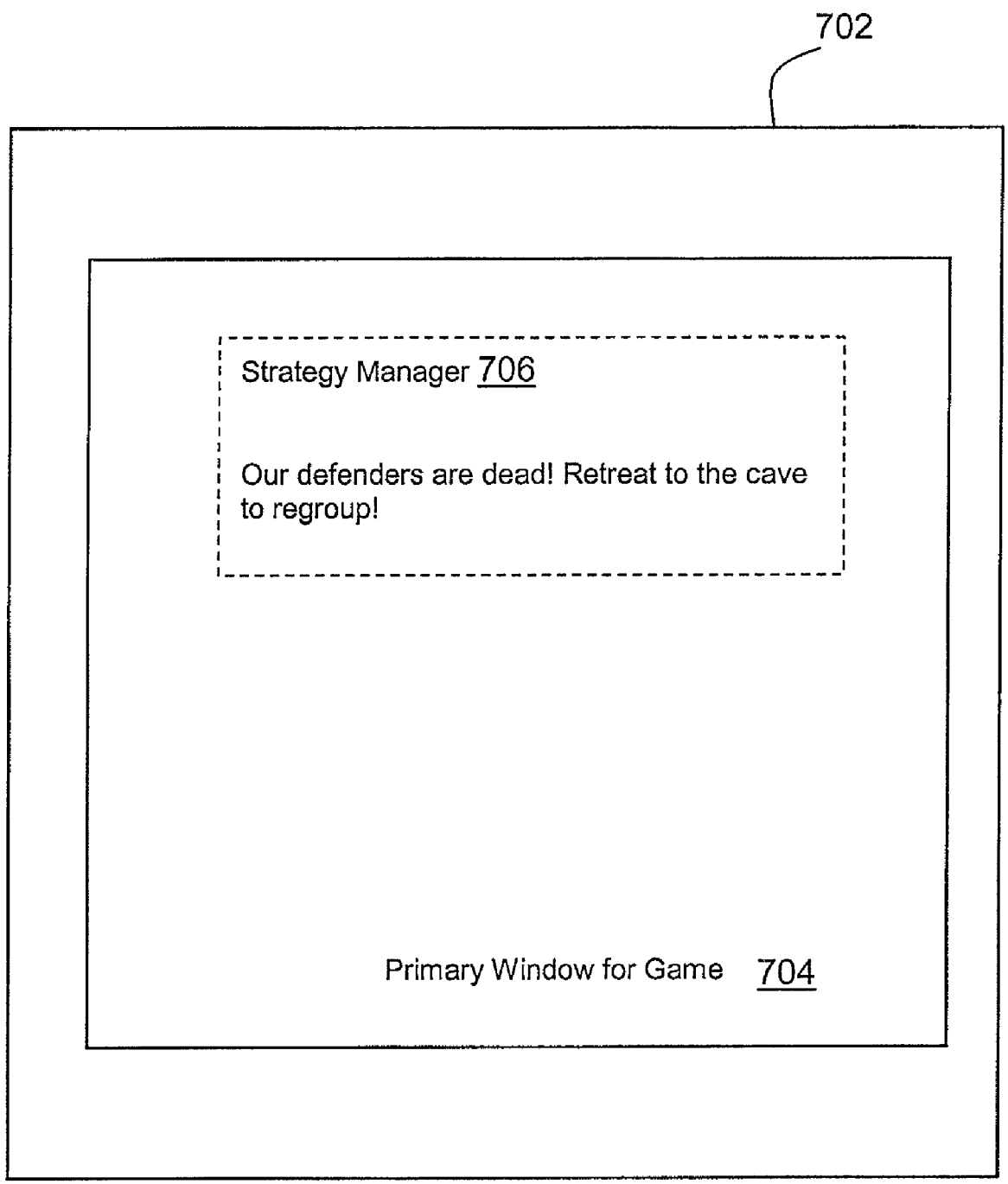

FIG. 7C illustrates an example of a circumstance based message in accordance with an embodiment of the present invention. In this example, the strategy manager 706 displays "Our defenders are dead! Retreat to the cave to regroup!", which may have been designated in the user created strategy to be displayed after the primary defenders have been killed.

Again, because the strategy manager in the system knows the state of the game, it detected the circumstance of the primary defenders being killed, which caused it to display the message as instructed by the user created strategy. This is yet another example of the strategy manager providing feedback based on comparing the game state to the user created strategy. In this example there was an immediate response from the system based on the defenders being killed.

In some embodiments, the triggering of events may be selection based. For example, the strategy data may allow the team leader to change the plan during the game, on the fly, similar to calling a so-called audible in football. The strategy data may provide the team leader with different plans or options to select from, and an event may be generated notifying the other players of a new or different plan that has been selected.

Figure 7D:
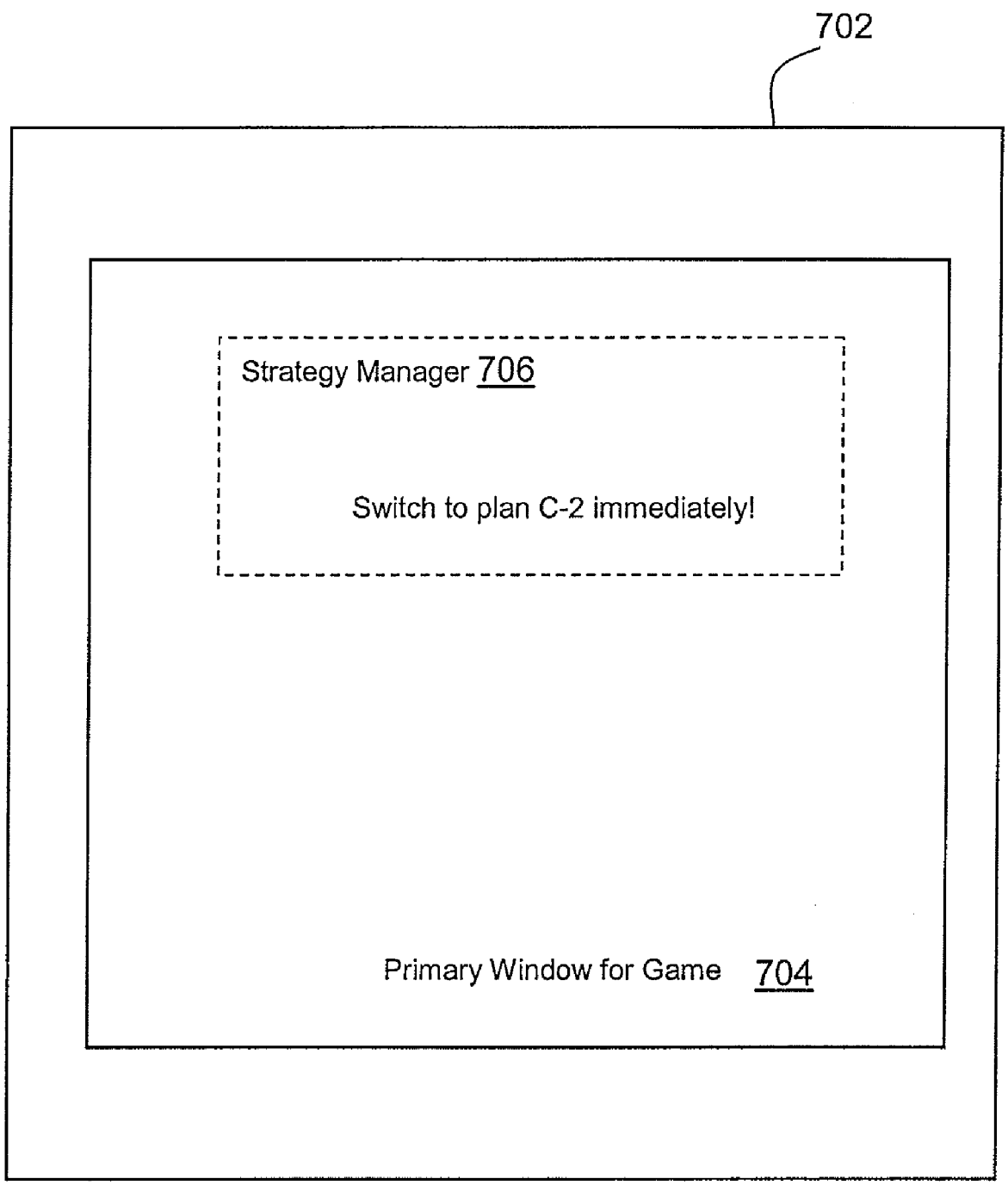

FIG. 7D illustrates an example of a selection based message in accordance with an embodiment of the present invention. In this example, the strategy manager 706 displays "Switch to plan C-2 immediately!", which may have just been decided upon by the team leader. Namely, the game may not have been going as planned, and so the team leader made a decision to switch to a fallback position or plan. In some embodiments, the strategy manager 706 may provide an option for the user to pull up the details of plan C-2 in case he or she has forgotten those details.

Figure 7E:
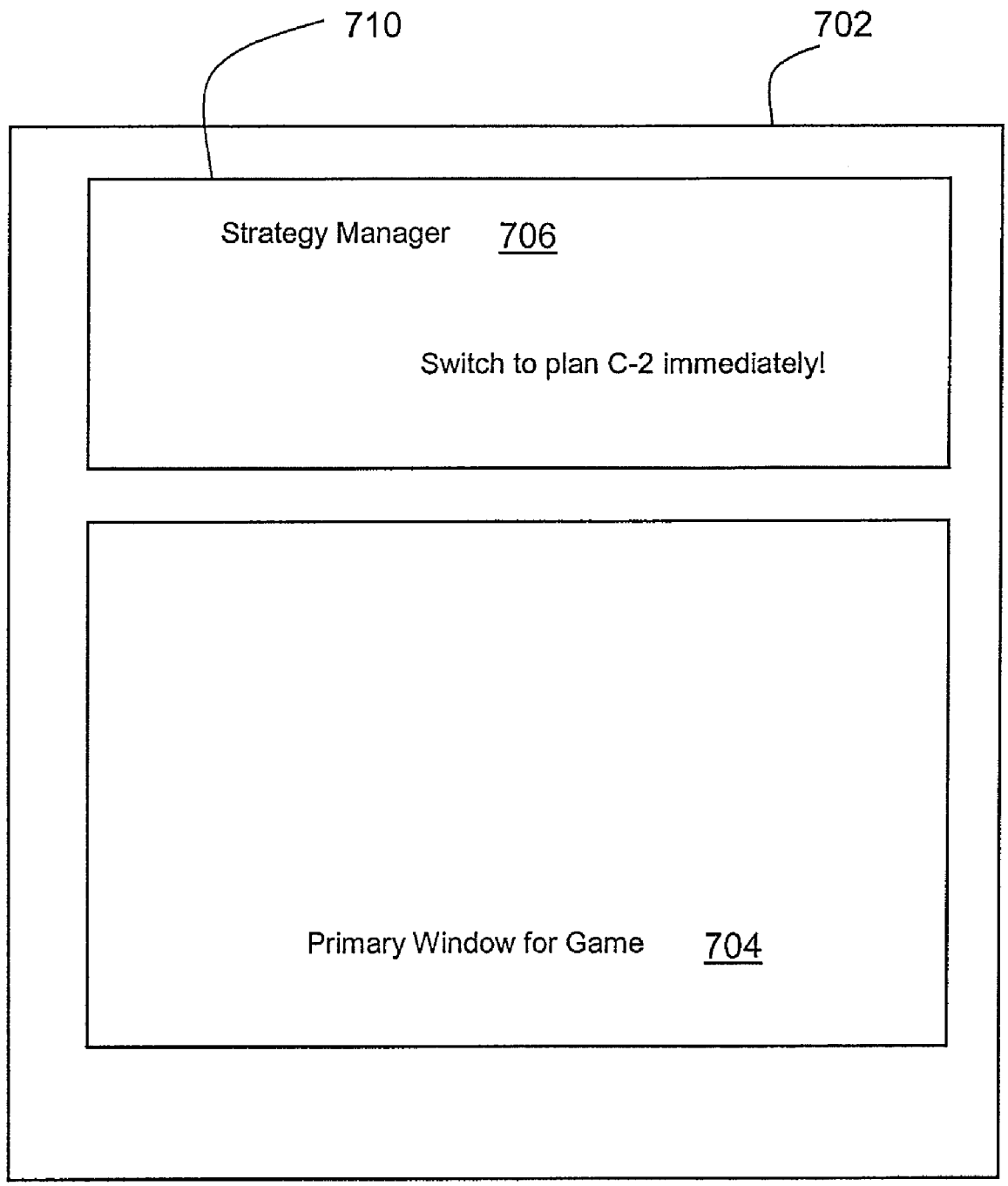

As mentioned above, in some embodiments the strategy manager area 706 may be included in a separate user interface or window. FIG. 7E illustrates an example of such an embodiment for the immediately preceding example of a selection based message. As illustrated, the strategy manager area 706 is included in a separate user interface or window 710. In some embodiments, the strategy manager area 706 may have its own interface or window or a shared interface or window. In some embodiments, the strategy manager area 706 may be included in, or integrated with, any other window or interface. In some embodiments, the ability to allow users associated with a subset of the plurality of client devices to interact with the information may comprise allowing a user to provide information for each of one or more phases of the simulation. For example, the information that includes a representation of at least a portion of an environment of the simulation may further comprise an ability for a strategy to be broken into phases. An example of breaking a strategy down into phases is as follows:

Phase I: Secure left and right flank;
Phase II: Strike team move into position up the center of the map;
Phase III: Backup team move into position behind strike team and rear defense adjust perimeter;
Phase IV: Strike team advance toward flag; and
Phase V: Strike team take flag.

In some embodiments, such ability may be implemented by having a place in a strategy creator where a user can interact with maps representing different phases of the game or other simulation. This may allow each of these phases to be diagramed individually. This feature may be akin to having several "chalkboards" for the different phases of the game and may help drive the strategy session into the actual game session.

Figure 8:
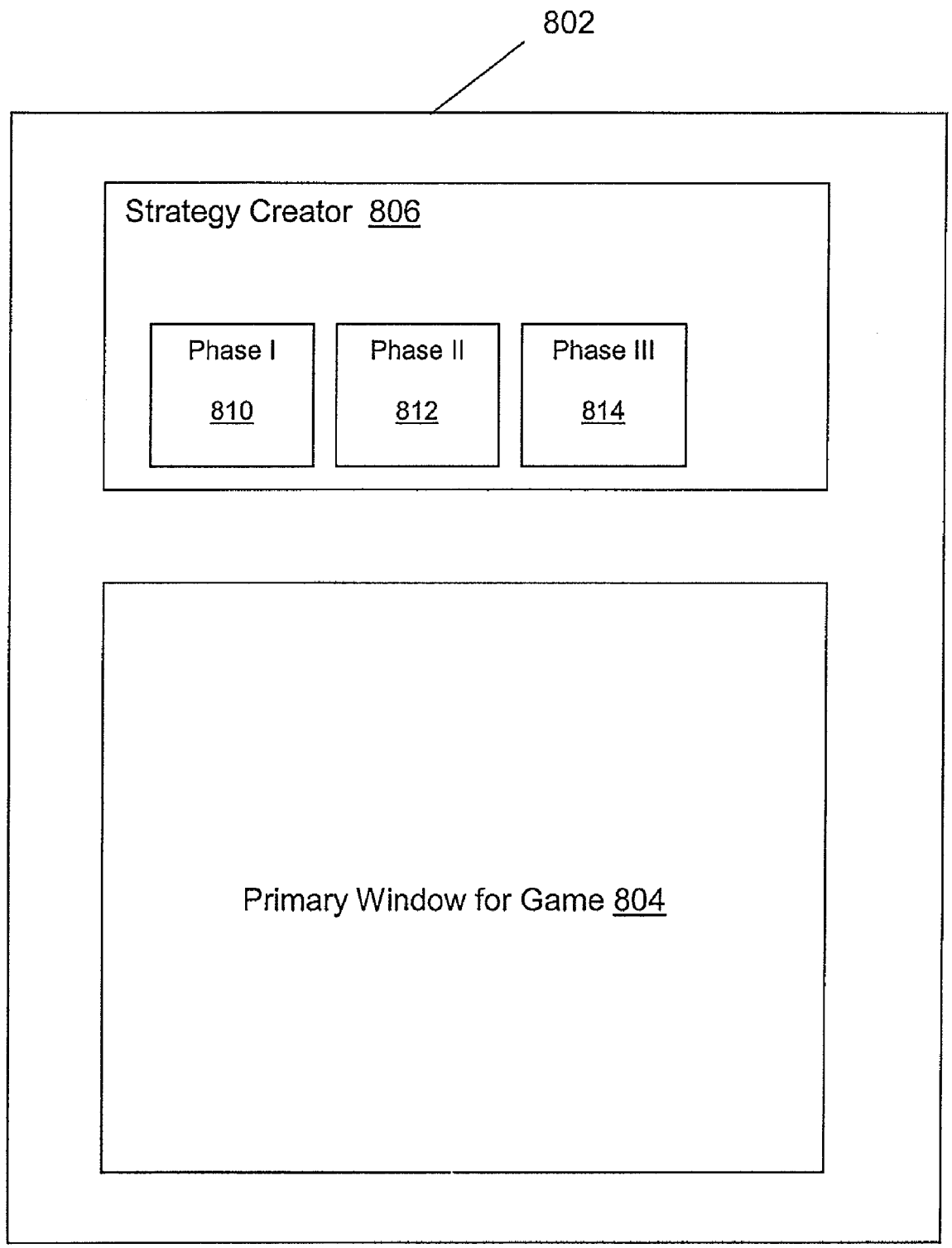
FIG. 8 is a block diagram illustrating example interfaces that may be used for implementing methods and/or techniques shown and described herein in accordance with another embodiment of the present invention.

FIG. 8 illustrates an example of such a feature in accordance with an embodiment of the present invention. Specifically, a display 802 on any type of client device may display a "primary window for the game" 804 and a "strategy creator" 806 where clan members can create game strategies. The "strategy creator" 806 may include icons 810, 812, 814 which can be clicked on to bring up maps for Phases I, II, III, respectively. The user may then zoom in on those maps to plan a strategy for each phase. In this embodiment, the strategy creator 806 is illustrated as being in a separate or second user interface or window. However, as described above it should be well understood that in some embodiments the strategy creator 806 may be included in, or integrated with, the primary game window 804.

If a game or other simulation has been broken into phases in this or a similar manner, then an event that gets generated may comprise an indication that a phase of the simulation has ended, started, failed, been canceled, etc. That is, the events that get generated may comprise "in-game" reminders or bulletins of user created, predetermined strategy as it relates to the phases of the simulation.

As an example, strategy phases may be arranged by time. In this scenario a clan may decide that Phase II should start four minutes into the game. This information may be inserted and included in the strategy data so that the game automatically reminds the players four minutes into the game via an onscreen cue, audio cue, or similar notification. This may help keep all team members up to date on the latest objectives during game play.

As another example, strategy phases may also be arranged in relation to dependencies on one another. For example, in this scenario the strategy creator or other interface may include ways to have Phase IV depend on the successful completion of Phase III. In some embodiments, the team members may get automated messages from the strategy system informing them that Phase III is complete, and now Phase IV should be underway. Thus, the system may provide messages to the clan members informing them that clan-determined mission goals have been completed and now the objectives have changed.

In some embodiments, the information that includes a created strategy may be available to the users associated with the subset of the plurality of client devices before and/or during the game or other simulation. That is, in such embodiments the "chalkboard" or other strategy creator area for each phase may be available in-game for each user and would not necessarily disappear when the game starts. An embodiment of this concept has already been illustrated above in FIGS. 7A-7D which show the strategy manager 706 being available during the game. In some embodiments, each player may be provided the ability to optionally pull up the map showing his or her responsibilities during each phase of the game or match. This would allow players to access the strategy manager from within their game. In some embodiments, the map may include adjustable granularity so that a player may see what his or her squad is assigned to do, then what his or her team is tasked with, and finally the tasks for which he or she is individually responsible. For example, a forgetful football receiver may get to the line of scrimmage, and then use the strategy manager to remind him of his responsibilities (e.g. go down field fifteen yards, and go left to the sideline).

In some embodiments, the ability to allow users associated with a subset of the plurality of client devices to interact with the information may comprise allowing a user to record a character taking a certain route in the simulation. For example, the user creating the strategy may record his or her character taking a certain route through the level or game map. The other players in the clan may then watch the recording, for example as a stand-alone clip. In some embodiments a "ghost" of the recorded character may be shown so that the other players may follow it. Such a feature may farther assist the strategy portion becoming part of the "in-game" experience.

Figure 9:
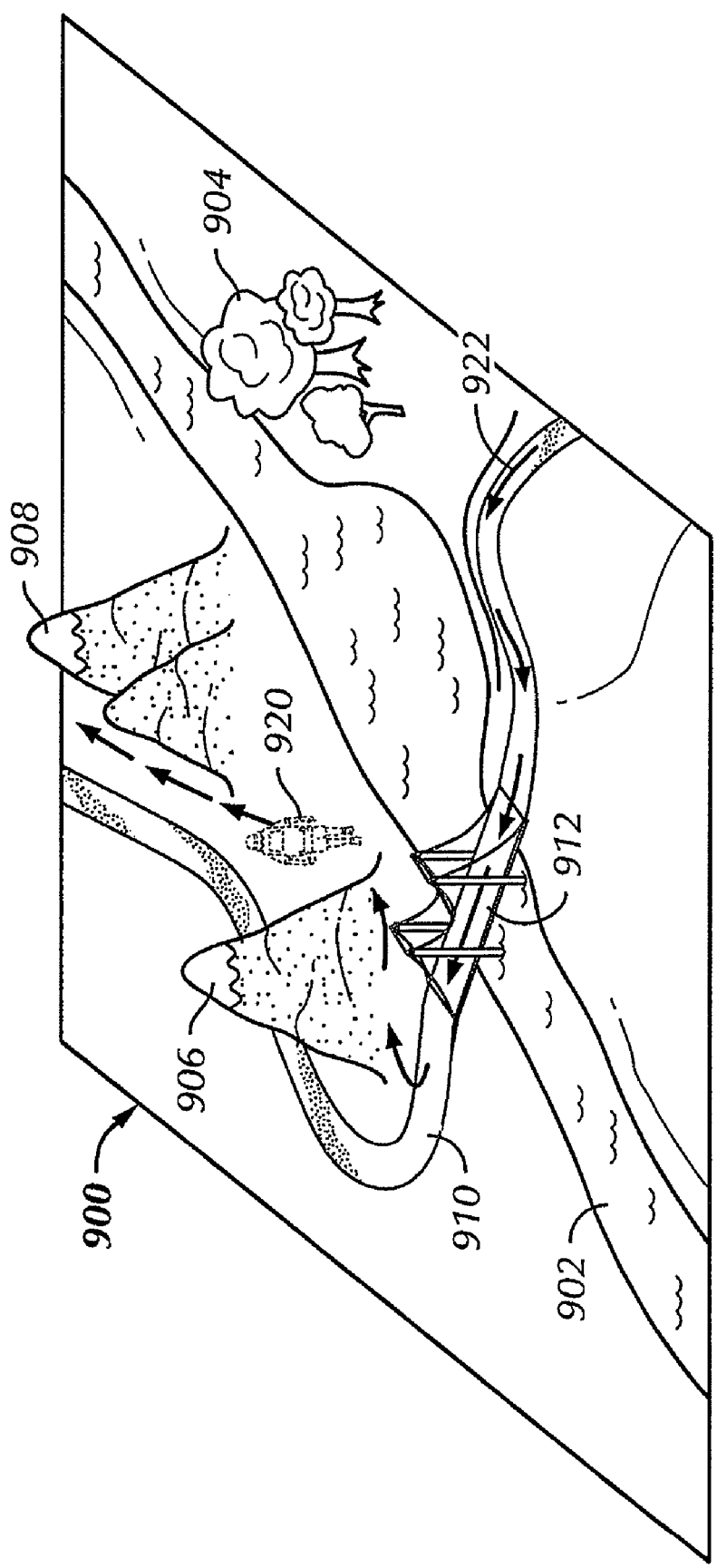
FIG. 9 is a pictorial diagram illustrating an example application of methods and/or techniques shown and described herein in accordance with an embodiment of the present invention.

FIG. 9 illustrates an example of such a feature in accordance with an embodiment of the present invention. Specifically, a portion 900 of the actual game map may be displayed in a strategy creator for allowing clan members to create game strategies. The map may show features such as a river 902, forest 904, mountains 906, 908, road 910, and bridge 912. In some embodiments, the user creating the strategy may have the ability to make his or her character actually go down into the game map to test various routes and scenarios in creating the strategy. The user creating the strategy may record a ghost 920 of his or her character taking a certain route through the game map, which route is indicated by arrows 922. As illustrated, the character initially stays on the road 910 and bridge 912, but then the character veers off of the road 910 to take an off-road route between the mountains 906, 908. This off-road route may be a key element of the user's strategy that he or she wants the other clan members to view.

Thus, by allowing the user created strategy data to be translated into in-game events effecting game play, the "chalkboard" or other strategy creator area can come to life in a game or other simulation. For example, as discussed above, automated in-game messages may be provided to the clan members about their progress based on the user-created strategies. In some embodiments, mechanisms may provide for a multi-phased battle plan, which may involve an ability to draw on more than one map based on phases and their relation to one another. Notifications may be provided to players to determine when phases start/end (chronologically, dependent upon each other, etc.). And some embodiments provide for user-initiated access to strategy "chalkboards" while in game to make the strategy information accessible while the user is actually controlling his or her character in the game world while playing the game.

In some embodiments, the strategy creator and/or strategy manager may be overlayed onto, or integrated with, the game or other simulation interface or window. In some embodiments, the strategy creator and/or strategy manager may be implemented in one or more separate interfaces or windows. The strategy creator and/or strategy manager may have their own interfaces or may have shared interfaces. Furthermore, in some embodiments the strategy creator and strategy manager may comprise the same system, and in some embodiments the strategy creator and strategy manager may comprise separate systems.

In some embodiments, a server such as the server 104 (FIG. 1) described above may generate the events. The server may compare the game state to the user created strategy and determine whether or not an event should be generated.

Figure 10:
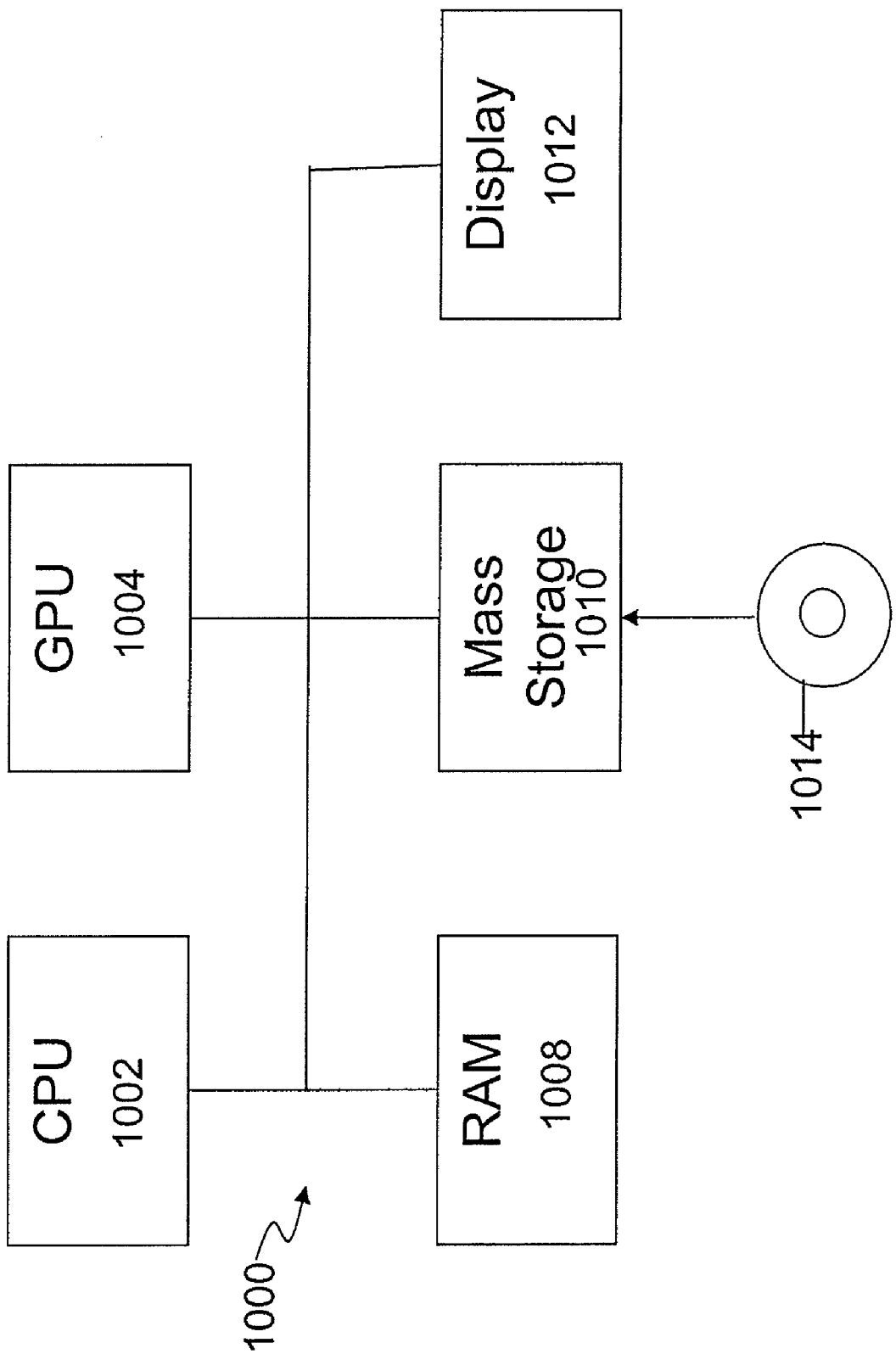
FIG. 10 is a block diagram illustrating a processor based system that may be used to run, implement and/or execute the methods and/or techniques shown and described herein in accordance with embodiments of the present invention.

The methods and techniques described herein may be utilized, implemented and/or run on many different types of systems, computers, graphics workstations, video game consoles, televisions, entertainment systems, video game systems, DVD players, DVRs, media players, home servers, and the like. Referring to FIG. 10, there is illustrated a system 1000 that may be used for any such implementations. One or more components of the system 1000 may be used for implementing any system or device mentioned above, such as for example any client device or server. However, the use of the system 1000 or any portion thereof is certainly not required.

By way of example, the system 1000 may include, but is not required to include, a central processing unit (CPU) 1002, a graphics processing unit (GPU) 1004, a random access memory (RAM) 1008, and a mass storage unit 1010, such as a disk drive. The system 1000 may be coupled to, or integrated with, a display 1012, such as for example any type of display. The system 1000 comprises an example of a processor based system.

The CPU 1002 and/or GPU 1004 may be used to execute or assist in executing the steps of the methods and techniques described herein, and various program content, images, areas, and interfaces may be rendered on the display 1012. Removable storage media 1014 may optionally be used with the mass storage unit 1010, which may be used for storing code that implements the methods and techniques described herein. However, any of the storage devices, such as the RAM 1008 or mass storage unit 1010, may be used for storing such code. Furthermore, any of the storage devices, such as the RAM 1008 or mass storage unit 1010, may be used for storing the strategy data or database described above. Either all or a portion of the system 1000 may be embodied in any type of device, such as for example a computer, workstation, television, video game console or system, or any other type of device, including any type of device mentioned herein.

While the invention herein disclosed has been described by means of specific embodiments and applications thereof, numerous modifications and variations could be made thereto by those skilled in the art without departing from the scope of the invention set forth in the claims.

What is claimed is:

1. A method for use with a computer simulation, comprising:
    running a simulation in which a group of at least three processor based client devices communicate over a network to interact with the simulation;
    causing a first user interface to be generated on each of the client devices in the group for allowing users associated with the client devices to interact with the simulation;
    providing information that includes a representation of at least a portion of an environment of the simulation on a subset of the group of client devices wherein the subset includes at least two client devices but is less than a total number of client devices in the group; and
    allowing users associated with the subset of client devices to interact with the information without allowing access thereto by the other client devices in the group.

2. A method in accordance with claim 1, wherein the interacting with the information comprises adding additional information to the representation of at least a portion of an environment of the simulation.

3. A method in accordance with claim 2, wherein the additional information added to the representation of at least a portion of an environment of the simulation relates to a strategy for use in the simulation.

4. A method in accordance with claim 2, wherein the additional information added to the representation of at least a portion of an environment of the simulation comprises one or more illustrations.

5. A method in accordance with claim 2, wherein the additional information added to the representation of at least a portion of an environment of the simulation comprises text.

6. A method in accordance with claim 2, further comprising storing the additional information added to the representation of at least a portion of an environment of the simulation.

7. A method in accordance with claim 1, wherein the representation of at least a portion of an environment of the simulation comprises a map.

8. A method in accordance with claim 1, wherein the simulation comprises a game.

9. A method in accordance with claim 1, wherein the users associated with the subset of client devices comprise a team in the simulation.

10. A method in accordance with claim 1, further comprising interacting with the information by at least one of the users associated with the subset of client devices prior to a start of the simulation to add additional information to the representation of at least a portion of an environment of the simulation.

11. A method in accordance with claim 10, further comprising viewing the additional information added to the representation of at least a portion of an environment of the simulation by at least one of the users associated with the subset of client devices prior to a start of the simulation.

12. A method in accordance with claim 1, wherein the information is provided in the first user interface on the subset of client devices.

13. A method in accordance with claim 1, wherein the information is provided in a second user interface that is generated on the subset of client devices.

14. A system for use in running a computer simulation, comprising:
a network;
a server coupled to the network; and
a plurality of client devices coupled to the network;
wherein the server and client devices are configured to run a simulation in which a group of at least three client devices communicate over the network to interact with the simulation, generate a first user interface on each of client devices in the group for allowing users associated with the client devices to interact with the simulation, provide information that includes a representation of at least a portion of an environment of the simulation on a subset of the group of client devices wherein the subset includes at least two client devices but is less than a total number of client devices in the group, and allow users associated with the subset of client devices to interact with the information without allowing access thereto by the other client devices in the group.

15. A system in accordance with claim 14, wherein the interacting with the information provided comprises adding additional information to the representation of at least a portion of an environment of the simulation.

16. A system in accordance with claim 15, wherein the additional information added to the representation of at least a portion of an environment of the simulation relates to a strategy for use in the simulation.

17. A system in accordance with claim 15, wherein the additional information added to the representation of at least a portion of an environment of the simulation comprises one or more illustrations.

18. A system in accordance with claim 15, wherein the additional information added to the representation of at least a portion of an environment of the simulation comprises text.

19. A system in accordance with claim 15, wherein the server and client devices are further configured to store the additional information added to the representation of at least a portion of an environment of the simulation.

20. A system in accordance with claim 14, wherein the representation of at least a portion of an environment of the simulation comprises a map.

21. A system in accordance with claim 14, wherein the simulation comprises a game.

22. A system in accordance with claim 14, wherein users associated with the subset of client devices comprise a team in the simulation.

23. A system in accordance with claim 14, wherein the information is provided in the first user interface on the subset of client devices.

24. A system in accordance with claim 14, wherein the information is provided in a second user interface that is generated on the subset of client devices.

25. A storage medium storing a computer program executable by a processor based system, the computer program causing the processor based system to execute steps comprising:
communicating over a network to interact with a simulation in which a group of at least three client devices are participating;
generating a first user interface for allowing a user to interact with the simulation;
providing information that includes a representation of at least a portion of an environment of the simulation; and
establishing the user as part of a subset of users having access to and which can interact with the provided information;
wherein the subset of users includes users associated with a subset of the group of client devices and that client devices not in the subset of client devices are denied access to the provided information;
wherein the subset of client devices includes at least two client devices but is less than a total number of client devices in the group.

26. A storage medium in accordance with claim 25, wherein the computer program further causes the processor based system to allow the user to interact with the provided information by adding additional information to the representation of at least a portion of an environment of the simulation.

27. A storage medium in accordance with claim 26, wherein the additional information relates to a strategy for use in the simulation.

28. A storage medium in accordance with claim 26, wherein the additional information comprises one or more illustrations.

29. A storage medium in accordance with claim 26, wherein the additional information comprises text.

30. A storage medium in accordance with claim 25, wherein the representation of at least a portion of an environment of the simulation comprises a map.

31. A storage medium in accordance with claim 25, wherein the simulation comprises a game.

32. A storage medium in accordance with claim 25, wherein the group of users comprise a team in the simulation.

33. A storage medium in accordance with claim 14, wherein the information is provided in the first user interface on the subset of the plurality of client devices.

34. A storage medium in accordance with claim 14, wherein the information is provided in a second user interface that is generated on the subset of the plurality of client devices.

35. A storage medium storing a computer program executable by a processor based system, the computer program configured to cause the processor based system to execute steps comprising:
running a simulation in which a group of at least three client devices communicate over a network to interact with the simulation;
causing a first user interface to be generated on each of the client devices in the group for allowing users associated with the client devices to interact with the simulation;
causing strategy creator information to be generated on a subset of the group of client devices without allowing access thereto by the other client devices, wherein the subset includes at least two client devices but is less than a total number of client devices in the group;
receiving user created strategy information in response to an interaction with the strategy creator information on at least one of the subset of client devices.

\* \* \* \* \*

UNITED STATES PATENT AND TRADEMARK OFFICE
CERTIFICATE OF CORRECTION

| | |
|---|---|
| PATENT NO. | : 8,145,702 B2 |
| APPLICATION NO. | : 11/754113 |
| DATED | : March 27, 2012 |
| INVENTOR(S) | : Russell D. Patterson |

Page 1 of 1

It is certified that error appears in the above-identified patent and that said Letters Patent is hereby corrected as shown below:

In the Specification

Column 1, Line 9, delete "May 27" and insert --May 25--, therefor.

In the Claims

Column 13, Line 21, Claim 14, delete "client" and insert --the client--, therefor.

Column 14, Line 40, Claim 33, delete "14" and insert --25--, therefor.

Column 14, Line 42, Claim 33, delete "of the plurality of" and insert --of--, therefor.

Column 14, Line 43, Claim 34, delete "14" and insert --25--, therefor.

Column 14, Line 45, Claim 34, delete "of the plurality of" and insert --of--, therefor.

Signed and Sealed this
Sixth Day of May, 2014

Michelle K. Lee
*Deputy Director of the United States Patent and Trademark Office*